April 1, 1941.　　　I. A. RIMMEL　　　2,236,837
GLUE POT
Filed April 11, 1939
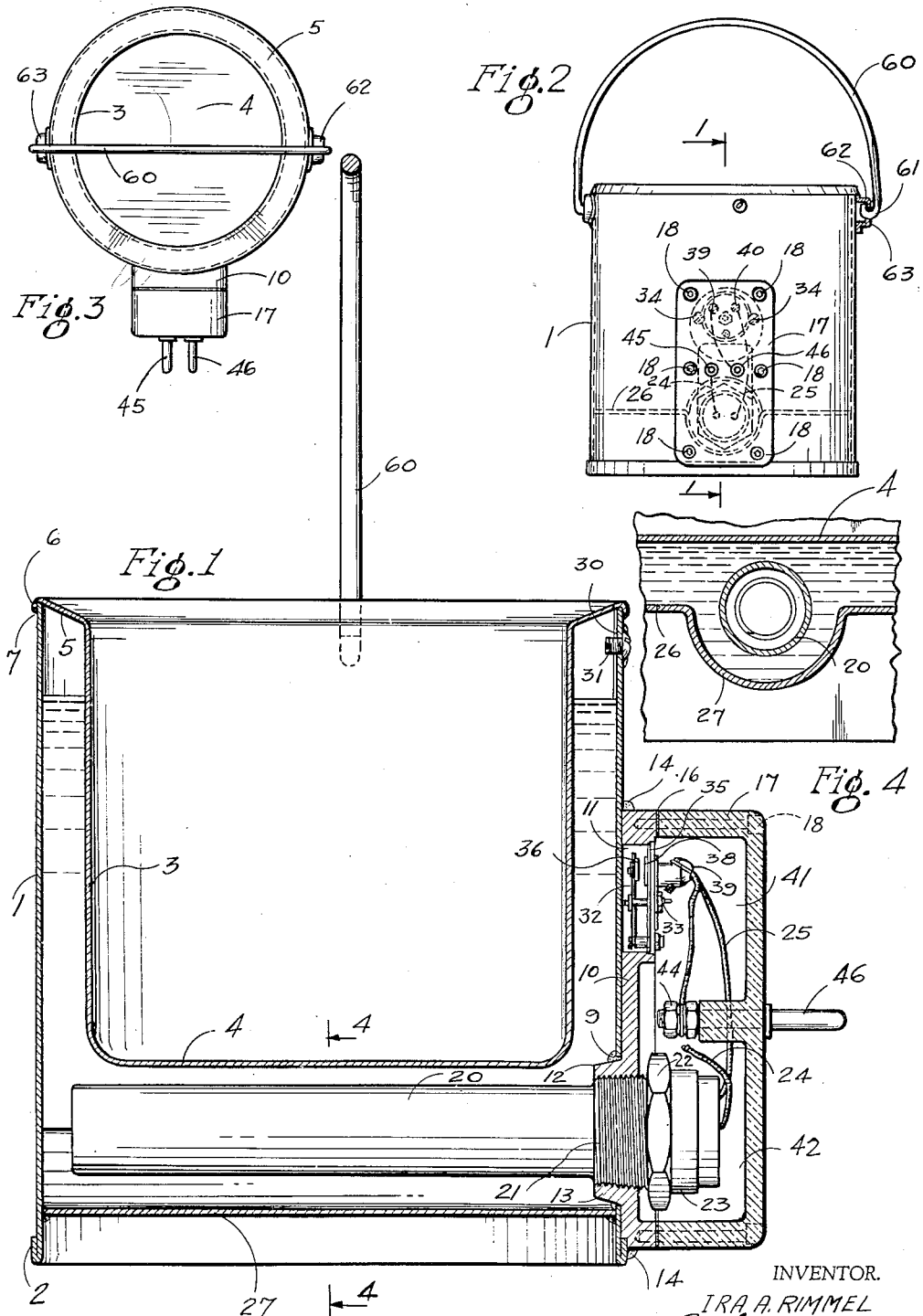
INVENTOR.
IRA A. RIMMEL
BY Richey & Watts
ATTORNEYS Patented Apr. 1, 1941

2,236,837

UNITED STATES PATENT OFFICE 2,236,837

GLUE POT

Ira A. Rimmel, Lakewood, Ohio, assignor to The Kindt-Collins Co., Lakewood, Ohio, a corporation of Ohio Application April 11, 1939, Serial No. 267,292

3 Claims. (Cl. 219—44)

This invention relates to improvements in vessels for heating and keeping hot glue or other substances, and more particularly to an improved glue pot and the method of making the same.

Although glue pots are old in the art and there are many types of electrically heated glue pots, these various pots have had many deficiencies in construction and operation which it is the purpose of the present invention to overcome. For instance, the other types of apparatus were extremely cumbersome; moreover, they were quite complicated in construction. In operation they did not maintain the contents at a constant temperature, consumed a considerable amount of electricity, and were very apt to get out of order in a short time. Furthermore, the heat in these prior devices was not evenly distributed, there being some areas adjacent the heating element where the material was actually cooked, and others where it was hardly warmed. Those that used a fluid, required that the fluid be replaced periodically depending on the conditions of use and failure to replace the fluid often damaging, not only the contents, but the pot itself.

By the present invention I have provided a heating vessel, hereinafter called a glue pot, although obviously its use is not limited to heating glue, which has among its objects: to provide a glue pot having a fluid heat transfer medium wherein the fluid will last indefinitely and does not need replenishing; to provide a heat transfer mechanism wherein the heat element utilizes a relatively small space and may be easily and quickly removed or replaced; to provide a glue pot as so constructed that there is no danger of the glue pot blowing up should there be a failure of the thermostat; to provide a glue pot having more efficient heat transfer elements; to provide a glue pot where there is a minimum of current consumption; to provide a glue pot where the temperature limits of the heat may be more definitely maintained; to provide a glue pot which retains the heat for a longer period of time after the current is turned off; to provide a glue pot that may be adjusted to a predetermined maximum temperature and wherein the adjustment cannot easily be tampered with; and to provide a glue pot wherein the heat is distributed more evenly to all parts of the vessel.

Still other objects of the invention and the invention itself will become more apparent from the following description of an embodiment thereof, which description is illustrated by the accompanying drawing, and forms a part of this specification.

In the drawing:

Fig. 1 is a vertical medial sectional view of the vessel of my invention taken on the line 1—1 of Fig. 2;

Fig. 2 is a front elevational view thereof on a reduced scale;

Fig. 3 is a plan view on a reduced scale;

Fig. 4 is a fragmentary section taken on the lines 4—4 of Fig. 1.

In the drawing, throughout which like parts have been designated by like reference characters, there has been shown an outer shell and an inner shell sealed to each other to provide a vacuum-tight chamber therebetween. In the lower part of the chamber there is disposed an electrical heating element which serves to heat the fluid to the desired temperature. The fluid surrounds the inner vessel to a point spaced from the top and the temperature is maintained substantially constant by a thermostat electrically connected in the heating element circuit.

Specifically, the outer vessel 1 comprises a cylindrical shell of cold rolled steel, the bottom edge of which is turned back upon itself at 2 to form a bead having a rounded bottom edge which comprises a support for resting the vessel on any suitable support or table without cutting or scratching the same.

The inner vessel or pot 3 is formed of sheet copper, pressed or spun to provide a cylindrical body and a bottom 4. The upper edge of the pot 3 is flared outwardly as at 5 to provide the upper edge of the vessel, the wall of which is provided with a downwardly turned flange 6 adapted to fit over the upper edge of the outer wall 1. The inner pot is united in fluid tight engagement to the outer vessel wall by brazing, welding or soldering the flange 6, as indicated at 7, to the upper end of the outer wall.

The outer shell 1 is provided with a circular opening 9 spaced from the lower end. A saddle member 10 is secured to the outside of the shell, and comprises a generally rectangular brass frame formed with a recess 11 for the reception of a thermostat and an inwardly extending circular boss 12 at its lower end for the reception of the heating element. The boss 12 is provided with a threaded bore and an immersion type heating element 20 is screw threaded into the bore. The heating element has a cylindrical body which extends across the bottom of the pot, spaced from the inner shell bottom 4. The end of the element is provided with a threaded bore 21 for engagement in the boss 12, a hexagonal head 22 being provided by means of which a wrench may be used to screw the heating element into the boss. The end of the heating element has a body 23 from which extend the leads 24 and 25 which are connected to the interior resistance wires of the element. The threads 21 on the base are pipe threads which permit the element to be screwed in fluid tight engagement with the boss.

A bottom wall is provided for the outer shell and comprises a generally circular body 26, of the same diameter as the inside of the outer shell, and is formed with a semi-circular channel 27 traversing the bottom and adapted to receive in spaced relation therein the heating element 20. The bottom is brazed around its periphery to the wall of the outer shell in fluid tight engagement therewith.

The upper end of the outer shell is provided with a threaded opening 30 adapted to receive a screw 31 for filling purposes, later to be described.

The thermostat may be and preferably is of the disc type, of well known construction, being disposed in the recess 11 with the temperature response element 32 closely adjacent to the outer shell surface. It has the usual adjustment screw 33 by which its action is controlled. The thermostat is held in the recess by screws 34, the heads of which engage the supporting body 35 thereof. The disc is provided with an insulated contact bar 36 which connects together the contacts 38 which contacts are carried by the support 35 and are provided with terminals 39 and 40. The operation of the thermostat is well known and needs no description.

The Bakelite cover 17 is provided with recesses 41 and 42 opposite to the thermostat and heating element respectively. It also has terminals extending through the wall of the cover provided on the inside with nuts 44 threaded on the ends of the terminals and rods or prongs 45 and 46 protruding exteriorly from the cover for the reception of the usual electrical appliance plug and cord.

The terminal 45 is connected by the wire 24 directly to the heater element; the other connecting wire 25 of the heating element is connected to the terminal 40 of the thermostat, and the other terminal 39 of the thermostat is connected directly to the terminal 46. The thermostat is thus in series with the heating element.

In preparing the device for operation, the screw 31 is removed from the outer shell and the space between the inner and outer shells is filled with a suitable oil to a point spaced from the top. The oil used can be of any of the mineral types, having a high oxidation point to permit it to withstand the heat to which it may be subjected without oxidation. After the fluid space is filled, an electric current of the voltage on which the device is to be operated is supplied directly to the heating element, this being done before the installation of the cover 17, and the thermostat being shorted out of the circuit or the current supplied directly to the heating element without the thermostat being in the circuit.

The current is supplied to the heating element for a considerable length of time. This causes the oil to be heated far above the temperature necessary for the normal operation. After the device has thus been heated, which expands the oil and causes the air to be forced from the fluid chamber and out of the filler hole 30. The screw 31 is screwed back into the hole, the current turned off and the screw soldered to the wall of the container to provide a completely fluid tight chamber.

The device is then allowed to cool, after which the thermostat, which has previously been adjusted to turn off at a certain temperature, is connected into the circuit and the cover 17 placed in position. The screws 18 being countersunk in the cover, may be sealed by a suitable cement or wax to guard against tampering, and the device is ready for its regular service. When the device cools to room temperature I have found that the foregoing method of preparing it for service will give approximately 28 in. of vacuum in the oil chamber.

In operation, the glue or other material which is desired to be heated, is placed in the inner vessel and the device connected to a source of electric current such as the usual 110 v. A. C. line. The heating element heats the oil which in turn heats the inner vessel. After the oil reaches a predetermined temperature, say 162° F., the thermostat opens the circuit and keeps it open until the temperature falls to a predetermined value. I have found that with the pot full of glue and after it has once arrived at its operating temperature, it will operate for approximately 13 minutes on and 47 minutes off, maintaining the temperature between 142° and 162° F. with a current consumption of approximately 300 watts during the "on" period. At operating temperature, it will still maintain approximately 20 in. of vacuum in the oil chamber.

Because of its sealed nature, it is not subject to being tampered with. The glue is maintained at an even temperature through the pot, both because of the large area surrounded by the heat transfer of oil and because of the high heat conductivity of the copper.

Even should the thermostat fail to work, there is no danger of injuring the device because of the treatment received during the assembly process. Inasmuch as the chamber is sealed, there is no need of replenishing the fluid. Should the heating element be injured or burnt out, it is a relatively easy matter to install a new one.

Means for carrying the device is provided, and comprises a bail 60 having U-shaped ends 61 disposed in sockets 62 welded to the side of the container. It is to be noted that the apertures 63 in the bail sockets are below the center of the socket and that the upturned end of the U-shaped portion 61 of the bail is sufficiently long that it engages the side of the socket when the bail is lowered, preventing the bail from falling below a horizontal position and holding it out of contact with the side of the pot. This not only prevents the bail from getting hot, but makes it easier to grasp when desired.

Having thus described my invention in an embodiment thereof, I am aware that numerous and extensive departures therefrom will be apparent to those versed in the art, and I do not desire that my invention shall be limited otherwise than is expressed in the appended claims, and that these should be construed with a range of equivalents to which they may be entitled in view of the prior art.

I claim:

1. A device of the class described, inner and outer vessels hermetically sealed to each other to provide a chamber therebetween, an immersion heater element disposed in the bottom of said chamber, said chamber being formed to provide a sump below the inner vessel for the reception of the heater element, and said chamber being partially filled with an oil, said heater element adapted to heat the oil and the oil adapted to heat the inner container, and a thermostat disposed on the periphery of the outer vessel and connected in series with said heater element to regulate the temperature within the inner vessel.

2. A glue pot of the class described including inner and outer vessels disposed in spaced concentric relation and hermetically sealed to each other adjacent their tops, a bottom for the outer vessel formed to provide a sump extending diametrically thereacross between said vessels, a saddle secured to the outer vessel, an immersion heater element supported by the saddle and extending into said sump diametrically below and across the bottom of the inner vessel, the space between said vessels being nearly filled with a fluid, a thermostat supported by said saddle contiguous the periphery of the outer vessel and connected in series with said heater for controlling the temperature within the inner vessel and connector means for connecting the heater to a source of current to control the temperature of the fluid.

3. A device of the class described, inner and outer vessels disposed in spaced relation and hermetically sealed together, a bottom for said outer vessel formed to provide a sump, the space between said vessels being nearly filled with a fluid, an immersion heater element disposed in said sump and spaced from the inner vessel to form a restricted passage, whereby the fluid in said passage is initially heated and circulated over the periphery of the inner vessel for raising the temperature therein and a thermostat affixed on the periphery of the outer vessel and connected with said heater element for controlling the temperature within the inner vessel during the circulation of the fluid.

IRA A. RIMMEL.